May 14, 1940.　　　H. C. LOCKWOOD　　　2,200,887
APPARATUS FOR WELDING
Filed April 8, 1937　　　2 Sheets-Sheet 2

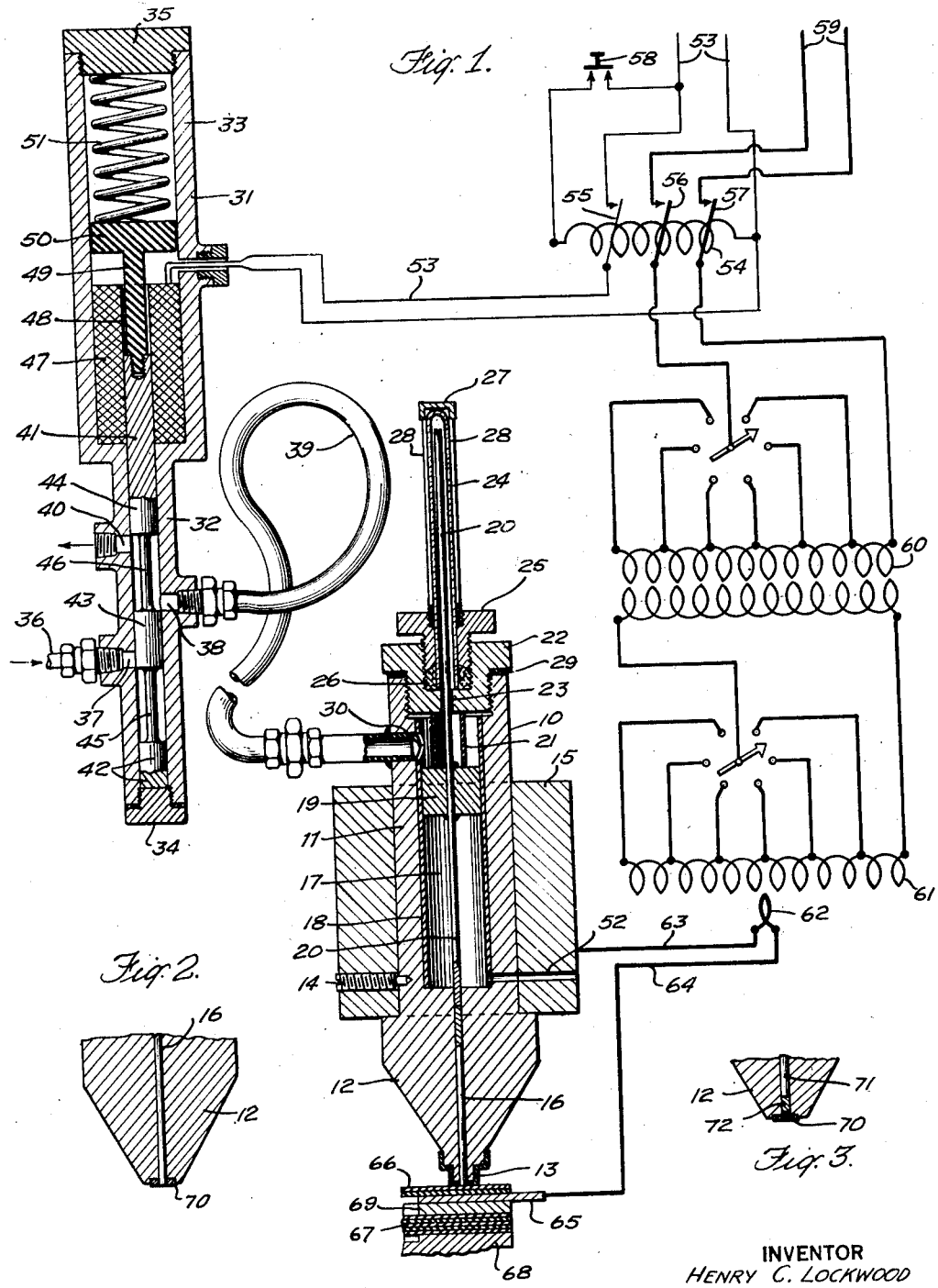

INVENTOR
HENRY C. LOCKWOOD
BY
ATTORNEY

Patented May 14, 1940

2,200,887

UNITED STATES PATENT OFFICE 2,200,887

APPARATUS FOR WELDING

Henry C. Lockwood, Brooklyn, N. Y.; Isabel Tyte Lockwood administratrix of said Henry C. Lockwood, deceased Application April 8, 1937, Serial No. 135,656

17 Claims. (Cl. 219—4)

This invention relates to welding and more particularly pertains to welding electrodes for electric resistance welding.

This application is a continuation-in-part of my copending application, Serial No. 753,849, filed November 20, 1934, now Patent No. 2,078,006, granted April 20, 1937.

Heretofore, resistance welding has been effected by two methods, viz., intermittent electrode contact with the work and continuous electrode contact. With both of these methods, the required welding heat has been generated by the application of alternating current either intermittently or of materially varying mean effective value.

The employment of the first of these methods to produce line or seam welds, that is, intermittent electrode contact with the work, produces a sequence of overlapping spot welds by progressing the work step-by-step between welding periods, while one or both electrodes are out of contact with the work and the welding current is disconnected. This method may produce a good discontinuous mechanical union between the welded parts, but it cannot produce a continuous seam joint which is capable of withstanding substantial pressure without leakage for the reason, among others, that the weld is not formed with a continuous heat and the overlapped welded spots have several times been brought successively to fusion condition and rigidity, which injures the metal and results in the production of relatively poor welds with burns and interstices. Moreover, this method is slow because of the mechanical movements required and the necessity for the interruption of the current between spot welds.

With the second of these methods, that is, continuous contact of the electrodes with the work, the mechanical and electrical contact between the electrodes and the work is established at the beginning of the welding operation and is maintained until the seam or line weld is completed. This method is generally carried out by the use of roller electrodes which roll in contact with the work. This method has never produced a satisfactory seam weld without interrupting the application of current to the work or by what amounts to the same thing in less degree, materially varying the mean effective value of the current so as to provide necessary cooling intervals to prevent the work from becoming overheated. By interrupting or materially varying or modulating the current, mechanical unions have been obtained which will withstand without leakage only nominal pressure, such as is encountered in commercial liquid containers, for the reason that the seam produced by the practice of this method is in all essentials the same as that produced by intermittent electrode contact, and is not a true, continuously formed seam but is merely a series of overlapped spot welds. The interrupters employed with this method are basically either mechanical or electrical. The first are not satisfactory because they require continuous maintenance and replacement of their electric contacts and are slow and retard production. The best of the electrical interrupters are electronic in action and while generally satisfactory for the function they perform, are expensive and limited in speed and capacity. Current interruption necessitates unnecessarily large capacity welding equipment and increases apparatus cost.

Accordingly, all prior methods of resistance seam welding employ a series of overlapping spot welds, each spot being successively heated, fused, cooled and frozen independently after the last spot has been completed and before the next spot is started. These methods result in discontinuous, uncertain welds.

The present invention provide electrodes which may be employed to produce pressure tight, continuous seam welds with continuous contact of the electrode with the work and with continuous application to the work of electric current of substantially constant mean effective value during the production of the entire weld. With this method overlapping spot welds are not produced and current interrupters are not required. A uniform, continuously laid down seam weld is achieved in one continuous heat, with no "in between" freezing periods and without danger of interstices. The fusion of welding runs along continuously without any interruption or change of intensity. The practice of my invention has made possible a speed of production of satisfactory seam welds which is materially greater than is possible with prior seam welding methods and equipment and with a machine capacity requirement and a power consumption materially less than with prior practices, with apparatus which is materially less expensive in both initial cost and maintenance. My invention makes it possible to successfully seam weld by electric resistance methods, metal of greater thicknesses than has been possible heretofore. The welding electrodes of my invention are also useful for spot welding as will hereinafter appear.

With electric resistance welding, an electrical condition which is ordinarily termed a "short circuit" must be dealt with because the resistances, ohmic and reactive, making up the secondary or welding circuit are of such a low order of magnitude. Tremendous electric currents and heat generation must therefore be dealt with. Due principally to surface irregularities of the work, work thickness, and heterogeneity of work structure, the electrical resistance of the work included between the electrodes varies from point to point and these variations in resistance determine the points of least resistance which will have "current flow" preference and be brought to fusion condition and welded or burned. Microscopic differences in physical conditions of work and electrodes are therefore controlling with respect to electric current flow density and heat generation density. Points of lowest work resistance, due to variations in work thickness and of work structure cause current and heat concentrations. High points due to surface irregularities of work and/or electrodes decrease contact area and also cause current and heat concentrations. For these reasons, if welding wheel electrodes of the prior art with their required comparatively broad contact faces are employed in an attempt to effect a seam weld with electric current of substantially constant mean effective value being continuously applied to the work, a continuous seam is not produced, but the result is merely a plurality of independent faulty spot welds disposed haphazardly over the area of the work with which the wheel electrodes have come in contact. Also, heat concentrations will have occurred and arcs will have been drawn at various points, and at these points the work will be pitted and burned. In cases where such faulty welding and burning are not of great importance, this weld may effect a fair mechanical union of the welded parts, but it clearly will not produce a seam capable of withstanding any substantial pressure. In spot welding, as soon as the current is applied after the electrodes have been brought into contact with the work and pressure has been imposed, the work will be brought to plastic fusing condition first at the point of least resistance in the work volume disposed between the electrodes, ordinarily one or more high spots in this area, but due to the pressure exerted by the electrodes, after the first point has become plastic, the weld area flattens and other spots of least resistance are traversed by the current and brought to plastic fusion condition until the current is broken and the plastic fused metal "freezes" to complete the weld. If irregularities in work and electrodes, as above set forth, are not too great, and heat dissipation is adequate, a successful spot weld will result. The "stitch" seam welds of the prior art, being nothing more than a series of overlapping spot welds, are formed in the same manner. Localized haphazard welds and heat concentrations occur, but these are usually covered by the larger welded areas which are necessary to overlap each other and fill in the blank spaces between current applications. However, to avoid burning the work, the weld must be formed with a series of independent power surges or "shots" of very short duration, to bring each stitch or spot to fusion condition without permitting these spots to become too large and thus absorb too much heat for safe dissipation. In other words, the rate of thermal conduction through, and absorption by, the metal of the work surrounding the weld area must be exceeded sufficiently by the rate at which the desired volume of work metal to be welded is brought to fusing temperature in order to prevent the heat generated by the resistance to the passage of the welding current from spreading beyond the desired bounds and increasing necessary heat dissipation beyond that which is possible under the conditions obtaining. To effect this approximate "instantaneity" of heating, relatively heavy current must be applied for a very short time to produce each stitch or spot. In prior art "stitch" or seam welding, accordingly, either current interruption or what amounts to the same thing in lesser degree, periodic material reduction of current value has been necessary because spot welding with its "power off" or "power reduced" periods for heat dissipation has been required. This follows from the fact that the wheel electrodes of the prior art have necessarily initially possessed relatively wide work contacting surfaces which become even wider as a result of deformation. With such wheel electrodes, therefore, great power is required to heat quickly to fusing condition the relatively large metal mass between the wheel electrodes. Accordingly, sound seam welds have not been produced heretofore by a continuous application of current of substantially constant mean effective value to the work because sufficient electrical power cannot be supplied with prior art equipment to heat the work fast enough to produce a satisfactory weld without ruining the work by burning, since the available resources for heat dissipation are not sufficient to retain the work within the bounds of the necessary temperature gradients and prevent burns and other weld faults.

It is for this reason, i. e., lack of adequate heat dissipation, that current interruption or periodic material reduction of current value with its in-between dead or materially lessened power periods had to be resorted to with prior welding methods. Another great difficulty caused by inadequate heat dissipation and which has made current interruption or periodic material reduction necessary is the adhesion of melted particles of the work to the electrodes. These work particles freeze and leave the work attached to and imbedded in the electrodes and cause arcs, burning and pitting of the work.

By the use of the electrodes of the present invention, a true continuous and substantially unvarying seam weld may be produced by a continuous application of electric current of substantially constant mean effective value which generates heat continuously during the formation of the entire seam without any burning or pitting of the work. Very thin stainless steel sheets containing eighteen percent of chromium and eight percent nickel, which probably represents the most difficult seam welding problem have been seam welded successfully by my electrodes. These seam welds have been tested in vessels arranged to impose an hydraulic pressure of 2500 lbs. per sq. in. on seams made in 0.018 in. thick stainless steel sheets and the seams withstood this pressure without any leakage whatsoever.

To produce seam or spot welds in accordance with my invention, I minimize the heat energy introduced into the work for the formation of the weld desired to the point, or beyond, where said heat energy input may be adequately dissipated without injury to work or weld or electrodes. This is accomplished by minimizing the mass or volume of the work through which the welding current is passed, thereby minimizing the mass of metal which must be brought to fusion temperature to form the weld. This may be done without adversely affecting the welds, because strength of the parent metal is far exceeded by the strength of the narrowest seam weld it is possible to produce. Simultaneously with the heating of the work, I provide adequate pressure thereon to eliminate so far as possible any surface irregularities; to bring the electrodes and all parts of the work between the electrodes into the best possible physical and electrical contact and to effect the welded union of the parts of the work after having been heated to fusion temperature.

By minimizing the mass or volume of the work through which the welding current is passed, I avoid the objectionable effects of surface irregularities of the work and the electrodes. To accomplish this, I supply the electric current to the work through electrodes of my invention, one or both of which has or have electrical work engagement upon an area such that the continuously applied electric current of substantially constant mean effective value, in its passage through the work, is confined substantially to that volume wherein the heat generated in the work is sufficient for the formation of the weld desired and is no greater than can be dissipated without injury to the work or the electrodes. The current in passing through the work is thereby restricted substantially to the desired narrow line of weld in seam welding and to the desired minimum volume in spot welding and flows through all points of the desired area of weld with substantially equal current density throughout the area. By minimizing the heat energy input to the work, I reduce the quantity of heat which must be dissipated. Under some circumstances, satisfactory welds can be produced by a heat energy input so small that no additional means are required for heat dissipation other than the usual mass cooling and air absorption. Under other circumstances, it may be necessary to use other heat dissipating means such as water. With a small heat input, the high fusion temperature is confined to the inner surfaces of the work sheets where they contact each other at the weld point and the exterior surfaces of the work sheets do not become molten. For this reason, particles of the work do not adhere to the electrodes and arcing and burning of the work do not occur.

In the drawings, I have illustrated preferred forms of electrodes embodying my invention by means of which my novel welding methods may be practiced. Referring to the drawings:

Fig. 1 is a longitudinal sectional view of one form of upper electrode and controlling mechanism embodying my invention, together with a wiring diagram therefor;

Fig. 2 is a partial sectional view of another form of electrode;

Fig. 3 is a view similar to Fig. 2 showing a further form of electrode;

Like characters of reference refer to the same or similar parts throughout the several views.

Figure 4:
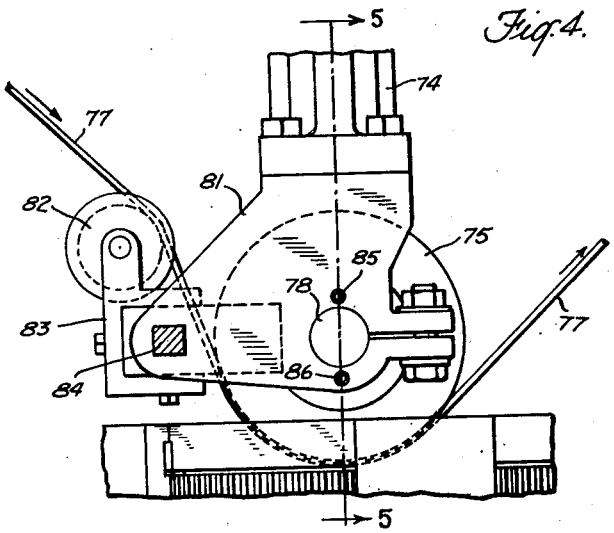
Fig. 4 is a partial elevational view of another form of electrode embodying my invention.

Referring to Fig. 1 of the drawings, the electrode 10 includes a cylindrical member 11 having an enlarged head 12 in the form of an inverted cone, over the lowermost end of which is snugly fitted a thin cup-shaped steel insulating member 13, the outside surface of which is coated with hard enamel. A dowel screw 14 retains the electrode in the supporting arm 15. The lower portion of the member 11 is provided with a relatively small diameter axial bore which receives, in relatively tight sliding fit relationship, a small diameter copper wire 16, the lower end of which projects through an aperture in member 13 which registers with the axial bore, and is adapted to contact with the work in sliding engagement along the desired line of weld. A copper rod of approximately 0.095 inch in diameter is satisfactory for this purpose but I do not wish to be limited to any particular size of rod or cross-sectional configuration thereof. The upper portion of the member 11 is provided with a relatively large axial bore 17 which connects with the upper end of the aforementioned small bore, and which is lined with a thin steel wear sleeve 18. Bore 17 provides a cylinder in which moves a pneumatically actuated piston 19 mounted on the intermediate portion of a small steel rod 20 which will slide in the small bore with its lower end in engagement with the upper end of the copper wire 16. Piston 19 carries a stop sleeve 21 to limit the upward movement of the piston. This sleeve engages a plug 22 which closes the upper end of bore 17. Plug 22 has an axial aperture 23 through which projects the upper end of steel rod 20 which functions as an indicator for the length of copper wire 16 remaining in the electrode 10. A glass tube 24 encloses the upper end of the rod 20 and this tube is retained in position by plug 25 and packing 26, the former being threaded into the plug 22. A metal guard 27 having opposed slots 28 to provide visibility, is disposed over the glass tube 24 and has its lower end threaded into plug 25. A gasket 29 disposed between the upper end of member 11 and the plug 22 prevents leakage from the bore 17. Piston 19 is located on rod 20 in such position that with the piston in its uppermost position, the lower end of rod 20 will be in the upper end of the bore carrying copper wire 16 and the piston will be positioned just below the air inlet 30 in the upper end of the bore 17.

An automatically operated air and exhaust valve 31 is employed to control the pressure exerted by the piston and steel rod 20 on the upper end of the copper welding rod 16. Valve 31 is fixed in some convenient position on the frame of the welding machine on which the electrode 10 is mounted and includes a small cylinder 32 and a larger cylinder 33 connected together and having their outer ends closed by plugs 34 and 35 respectively. Air is introduced to cylinder 32 through a line 36 and inlet port 37 disposed in the central portion of the cylinder. A combined outlet and inlet port 38 is located above the inlet port 37 and port 38 is connected to inlet 30 of the bore 17 by a flexible tube 39. Exhaust port 40 is provided in the upper end of the small cylinder 32. A metallic plunger 41 has three plunger heads 42, 43 and 44 respectively, which are spaced from each other by rods 45 and 46 respectively, moves in the cylinder 32, with the upper end of the plunger projecting into the lower end of the cylinder 33 to form a core for a solenoid 47. The plunger heads 42, 43 and 44 and the ports 37, 38 and 40 are so spaced and related that when the plunger is in its lowermost position with the lower end of head 42 resting on the plug 34, as shown in Fig. 1, head 43 closes inlet port 37 with its upper end lying just below port 38, while the lower end of head 44 lies just above the exhaust port 40 with ports 38 and 40 in communication, so that when the plunger is raised sufficiently, ports 37 and 38 will be in communication while port 40 will be closed. The upper end of plunger 41 extends about half way up in the axial opening 48 of the solenoid 47 disposed in the bottom of cylinder 33. A non-magnetic pusher piece 49 has a portion which extends into the opening 48 and into engagement with the upper end of plunger 41, and is provided with a head 50 which has a sliding fit with the cylinder 32. A coil compression spring 51 is interposed between pusher piece 49 and the plug 35 to urge the plunger 41 in a downward direction, so that normally the parts of the valve are in the position shown in Fig. 1 with the solenoid deenergized. A vent 52 is provided for the lower end of bore 17 of member 11, and extends through member 11 and through the supporting bar 15. Solenoid 47 is connected in a control circuit 53 having a three pole magnetic switch 54, the switch points being designated 55, 56 and 57 respectively. Circuit 53 is the control circuit and is controlled by a switch 58 which may be manually operated or may be arranged for automatic operation to be closed when the electrode 10 engages the work and to be opened when the electrode is withdrawn from contact therewith. The switch points 56 and 57 operate jointly and are connected in the welding circuit designated 59. This circuit includes a first transformer indicated 60 which is well known in the art, and needs no specific description, and a second transformer 61, similar to the first, the secondary of which is a single loop 62 of laminated copper. One end 63 of the single loop 62 is connected to the copper supporting arm 15 in which the electrode 10 is secured in good electrical contact, and the other end 64 of the loop 62 is connected to the lower electrode 65 to complete the circuit for the welding current through the work 66.

The operation of the form of the electrode disclosed in Fig. 1 of the drawings and the equipment associated therewith will now be described. The work, indicated 66, is two adjacent bellows plates of the character disclosed in the aforesaid parent application Serial No. 753,849, filed November 20, 1934, now Patent No. 2,078,006, granted April 20, 1937. The plates which have been welded previously are designated 67 and these rest upon a turn table 68 which is arranged to be rotated about a vertical axis to cause the work to move with respect to the upper electrode 10. The lower electrode 65 in the form of an annular copper gasket rests upon a steel insert ring 69 which provides a hard, smooth, practically unyielding surface to support the soft copper gasket 65 to thereby improve the character of the resulting seam weld as fully disclosed in the aforesaid parent application. The electrode disclosed in Fig. 1 of course, may be utilized for the welding of work other than the bellows plates disclosed.

With the upper electrode 10 in the position shown in Fig. 1, the secondary welding circuit is completed from the lower end of copper rod 16 in electrode 10 through the two bellows plates 66 and through the lower electrode or welding gasket 65. The motor is then started which drives the turntable 68 and is brought up to the proper constant speed necessary to provide the welding speed desired for the diameter of the weld being formed. Turntable 68 is thus caused to rotate and carry with it the plates 66 to be welded. The control circuit 53 is then closed by the operator, by pressing the control switch 58 which operates the magnetic switch 54 thereby closing the welding circuit 59 and energizing solenoid 47 in valve 31. The energization of the solenoid 47 causes plunger 41 to move upwardly against the action of spring 51 to such an extent that ports 37 and 38 of valve 31 are brought into communication with each other. Line 36 having previously been connected with a suitable source of air pressure, air under pressure is conducted into port 38 through pipe 39 and into the upper end of bore 17 in the electrode 10 through port 30. This pressure will be exerted on the upper end of piston 19 and will be communicated through steel rod 20 to the copper welding rod 16. The pressure so exerted on the copper rod 16 need only be sufficient to provide good electrical contact between the lower end of the copper rod and the upper surface of the upper plate 66. The heavy pressure necessary to provide good surface flatness and parallelism between the two plates 66 in the area surrounding the line of weld by removing or ironing out sufficiently the surface irregularities of these plates in this area and also to provide the pressure required for joining the two pieces of work metal at the weld after they have been brought to fusing temperature, is supplied through the cylindrical part 11 of the electrode 10 which acts through the nonconducting tip 13 on the lower end of the electrode. In the embodiment shown, this pressure is exerted by the operator through an operating lever which moves supporting arm 15 vertically but it will be understood that automatic means may be utilized for this purpose, if desired. This rotation of the work under the electrode 10 with the welding current being continuously applied to the work while the work is moved under the electrode, results in the formation of a true, continuous seam weld which unites the bellows plates to form a high pressure leak-proof joint. If necessary or desirable during the formation of the seam weld, cold water may be flowed or sprayed by any suitable means, onto the lower end of the electrode 10 so that the plates being welded are submerged in water during welding. In other words, cold water in sufficient quantity may be supplied to the work in the area being welded so that the weld will be formed under water and the heat generated by the passage of the welding current will be dissipated.

After the turntable 68 has made a complete revolution, and a little more to insure overlapping, and a continuous seam weld has been produced, the operator opens control switch 58 which causes automatic switch 54 to open switch points 56 and 57, thereby breaking the welding circuit and cutting off the supply of welding current to the electrode. At the same time, switch 55 is broken by the action of the automatic switch 54 and solenoid 47 in valve 31 is deenergized thereby permitting the pressure exerted by spring 51 to move plunger 41 downwardly to its lowermost position which closes port 37, thereby cutting off the air pressure from the piston 19 and placing ports 38 and 40 into communication with each other. The air pressure in bore 17 is thereby released through port 40 and the pressure exerted by rod 20 on the copper welding rod 16 is relieved. The operator then withdraws electrode 10 from contact with the plates 66. The motor driving the turn-table 68 is then stopped and the necessary steps are taken to remove the bellows assembly from work-holder 68 and to make it ready for the next weld.

Satisfactory pressure-tight, continuous seam welds are produced in accordance with my novel welding method by utilizing the welding electrode 10 illustrated in Fig. 1 when employed in connection with the means heretofore disclosed for completing the secondary welding circuit through the work to be welded. With this equipment, true pressure-tight, continuous seam welds are produced by a continuous application of heat generated by the resistance of the work to the passage of continuously applied electric current of substantially constant mean effective value for the duration of the entire length of the seam weld to be made. These seam welds are produced without any pitting or burning of the work and without producing any other harmful effects thereon.

With an electrode of the type illustrated in Fig. 1, it will be apparent that by utilizing an electrode rod 16 of very small diameter, the electrical contact area between the electrode rod and the work is very small and the consequent passage of the welding current through the work is confined to a very narrow line of weld in seam welding. Microscopic irregularities of work surface which may remain notwithstanding the "ironing out" pressure applied to the work by the non-conducting tip 13 of the electrode and any other irregularities are greatly minimized in the weld area by the narrowness thereof. It is thus apparent that by the arrangement of at least one of the electrodes so that a small area of electrical contact with the work is provided, as by utilizing a copper rod of small cross-sectional area with its axis normal to the plane of the work, there will be no possibility of haphazard, hit and miss, discontinuous spotting in the weld since the work is in contact only with the relatively very small area of the lower end of the copper rod. With a narrow weld, far less power is required since less metal has to be heated. Since all welding heat must be dissipated, this means that much less heat has to be disposed of with a narrow weld. This prevents pitting and burning and provides a uniform, perfect seam weld. Adequate pressure to bring the two plates or other parts being welded into good mechanical and electrical contact along the line of weld is provided by the operator exerting sufficient pressure through the supporting arm 15. This pressure is transmitted to the work through the non-conducting tip 13 of the lower end of the electrode. As previously mentioned, it will be understood that any pressure exerted through the supporting arm 15 by the operator or otherwise is not transmitted to the copper welding rod 16. The pressure on the copper rod is supplied entirely by pneumatic pressure which acts on piston 19 and as heretofore mentioned, this pressure need be sufficient only to maintain the lower end of the copper rod 16 in good electrical contact with the work. It will be seen therefore, that with the welding apparatus heretofore disclosed, complete independence of action is maintained between the (1) heavy pressure transmitted to the work to provide good mechanical and electrical contact between the parts being welded by ironing out the surface irregularities so far as possible and to provide the pressure to squeeze the two work pieces into a weld after they are raised to fusing temperature at the weld point, and the (2) light pressure transmitted to the copper rod which conducts the welding current to and from the work. In other words, I have provided an electrode for electric resistance welding having completely independent operating parts, one of which functions solely as an electrical conductor to conduct welding current to and from the work which only requires light pressure, and the other of which supplies the necessary forging pressure along the desired line of weld which requires heavy pressure. This construction places the heavy pressure necessary upon a strong member which carries no current and which will stand up indefinitely.

The heat generated in the electrodes and the work due to the resistance to the passage of the welding current may be dissipated by the use of water as heretofore described, if desired. An inspection of Fig. 1 will show that with the exception of that part which extends through the non-conducting tip 13, the copper rod 16 is entirely surrounded by relatively large volumes of copper which form the lower end of the electrode 10. In consequence, the welding current is maintained at relatively low density until it reaches the tip 13 where it is then concentrated into the lower end of the small copper rod 16 prior to its passage through the work. Since the tip 13 is made of relatively thin metal which is coated with hard enamel or other non-conducting material, the path through which the highest density current flows is reduced to a minimum, and as a result, the heat generated in the electrode 10 is maintained at a relatively very low, safe point and will be readily absorbed and dissipated. This avoids any deformation of the copper rod 16. With this arrangement, it will also be perceived that during the formation of the seam welds the lower end of electrode 10 and the lower end of copper rod 16 are maintained in sliding contact with the work, in consequence of which there is provided a continuously renewed and self-cleaning current carrying work contacting surface which aids in the formation of a satisfactory seam weld. It will also be seen that the small copper rod 16 is supported throughout its entire length thereby avoiding mechanical deformation of the rod due to any pressure which may be transmitted to it. The pressure of the non-conductor tip on the work prevents the lower end of the rod from mushrooming out between the non-conducting tip and the work surface.

It is also apparent that the non-conductor tip furnishing pressure to the work, completely surrounds and is immediately adjacent to, the welding rod 16, which is thus acting in the center of the pressure area, which "irons out" the work surface and closes the weld. This also assists heat dissipation.

In lieu of utilizing a non-conducting tip 13 which is fitted over the lower end of the electrode 10, a small thin ferrule 70, Fig. 2, of steel or other suitable metal having its lower work contacting end covered with a suitable hard non-conducting material, such as baked porcelain enamel for example, may be employed. If desired, the ferrule may be made entirely of non-conducting material which will withstand the pressure to be transmitted to the work through the ferrule.

As shown in Fig. 3, a copper rod 71 having a tip 72 of tungsten or other suitable high melting point and abrasion resistant metal, may be employed in the electrode 10 in place of the copper rod 16. Also, if desired, a short rod or wire consisting entirely of tungsten or other high melting point and abrasion resistant metal may be employed in lieu of the copper rod 16 or the tungsten tipped copper rod 71 shown in Fig. 3.

With electrodes of the type shown in Fig. 1, constant electrical contacting area between the electrode and the work is at all times maintained, since the small wire 16 is of practically uniform cross-sectional area throughout its length and is always restricted to this area at its work contacting end by the other parts of the electrode. The greater pressure imposed during welding on the other parts of the electrode, contributes to this result. This is important where the same conditions are maintained throughout the welding operation because if greater electrical contact area occurs, the unit heat supplied to the work will be insufficient to produce good welds, and if smaller electrical contact area occurs, the unit heat supplied will be greater and the resulting heat concentration will ruin the work.

The electrode shown in Fig. 1 may be utilized for spot welding. For this purpose, however, it is not essential that pneumatic or hydraulic pressure be applied to the small copper rod 16, but adequate pressure may be imposed by a coil spring or the like disposed in or on the electrode. The cooperating electrode may have a work engaging area approximately the same as that of the other electrode and preferably will be provided with a thin, relatively soft work engaging portion, to the work contacting surface of which there is imparted the properties of a smooth, relatively hard member which is interposed between the thin work engaging portion and the remainder of the electrode.

It will be understood that satisfactory seam welds may be made in accordance with my method and with the apparatus herein disclosed without utilizing the hardened steel insert rings 69 or their equivalent. When these insert rings are not employed in the manner heretofore described, the lower surface of the copper welding gasket or lower electrode 65 will rest on the bellows plates 67 which have been welded. However, better results are obtained by utilizing a perfectly smooth, flat, hard backing-up surface such as provided by the insert rings to support the relatively, thin soft copper welding gaskets thereby to avoid any tendency to cause burning and pitting or, on the other hand, non-welding of the work during welding which may occur repeatedly as a result of the separate or cumulative effect produced by reason of all the inner and outer welds respectively being made in alignment.

As above noted, in welding bellows without hardened insert rings, the soft copper welding gasket being used for the next weld lies directly upon and is backed up by the last weld. The copper welding gasket being soft and the welds in line, any irregularities in the previous weld upon which the gasket directly rests will be transmitted to the gasket. When a good normal weld is made, there is usually a slight concavity or groove across the weld area section. When the next corresponding weld is made, the soft copper gasket deforms into the groove and the next weld is apt to have a slightly deeper groove. Thus, when one weld is made over another in alignment therewith, as in the fabrication of bellows as herein disclosed, this weld groove is accentuated as successive welds are made. As these weld grooves accumulate depth, the backing up of the work at the weld point becomes "softer" and the weld accordingly weaker. Finally, strips will occur on the weld line, here and there, where no weld has taken place. When slight localized depressions occur in the previous weld, just the opposite occurs. Such slight depressions in the next previous weld which is disposed immediately under the copper welding gasket, provide recesses into which the copper gasket, when portions thereof become plastic or molten, flow, thereby lowering the upper surface of the gasket and drawing an arc which usually burns a hole through both pieces of work. When overheating occurs with an electrode of the wheel or roller type, small molten particles of the work freeze and adhere to the wheel, leaving the work on the wheel as the wheel rolls off the work. These adhering particles draw an arc as they leave the work surface and cause pits and burns. In the case of the electrodes herein disclosed, the electrode rod never leaves the work surface during the weld formation and, further, is completely surrounded by the pressure producing non-conducting tip. These dangers therefore cannot exist with the electrode herein disclosed. The use of the inserts 69 or their equivalent completely eliminates these disadvantageous effects resulting from the use of a soft metal electrode. The use of the hardened metal inserts makes it possible to obtain perfect seam welds regardless of any roughness in the surface beneath the welding gasket and also regardless of the softness of the welding gasket. It will be understood that this principle of using a smooth, hard, surface which resists deformation, to support a soft metal electrode is not limited in its application to the welding of bellows, but may be applied generally to seam and spot welding.

Figure 5:
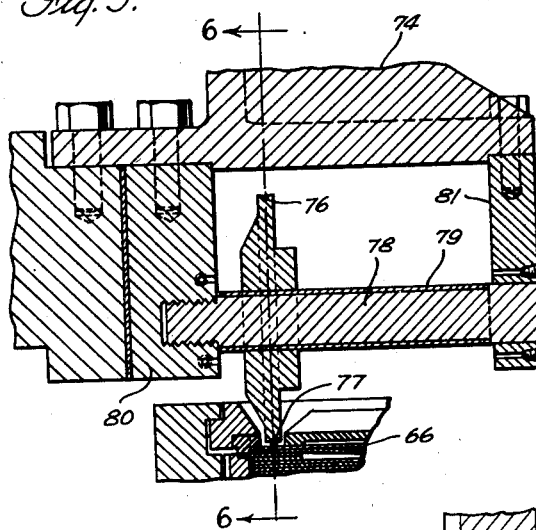
Fig. 5 is a sectional view taken on line 5—5 of Fig. 4.
Figure 6:
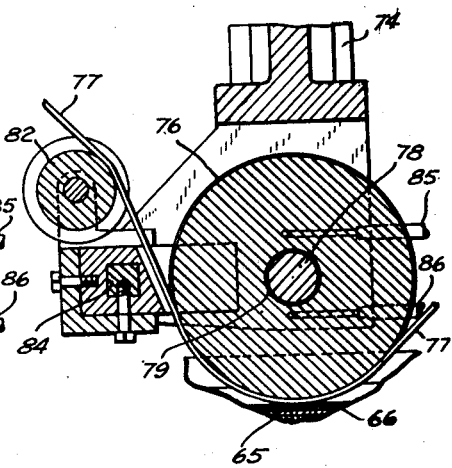
Fig. 6 is a sectional view taken on line 6—6 of Fig. 5.

In Figs. 4, 5 and 6 there is disclosed another form of electrode which may be employed to carry out my seam welding method, which not only provides rolling contact with the work but also continually furnishes a new work engaging surface as the welding progresses. This form of electrode comprises a rotatable wheel 75 of copper or other suitable metal or material, preferably but not necessarily having a peripheral groove 76 shaped and proportioned to receive a small diameter wire 77. I have found that a copper wire 0.095 inch in diameter will produce satisfactory seam welds, but wires of diameters or cross-sectional areas, different than this may be utilized, if desired. The wheel 75 and the wire 77 should be of such proportions as to provide a relatively small area of electrode contact with the work, preferably an electrical contact area such that the continuously applied current of substantially constant mean effective value, in passing through the work, is confined substantially to that volume wherein the heat generated in the work is sufficient for the formation of the weld desired and is no greater than can be dissipated without injury to the work or to the electrodes. The wheel design should preferably be such that the surface contact between the wheel and wire is sufficient to permit the dissipation of the heat generated by the flow of current through the wire without injurious effects thereto and is sufficient to support that portion of the wire through which the current passes, to at least one-half the circumference of the wire. The ends of the wire 77 may be reeled and any suitable means may be employed to drive one or both reels and to provide the required tautness in the wire. The wheel 75 may be revolvably and slidably mounted on a copper shaft 78 having a thin steel sleeve 79 thereon to provide resistance to wear. The shaft may be carried by spaced supporting arms 80 and 81 both of which are secured to the head 74 of the machine. A guide wheel 82 may be provided for the wire 77 and this wheel may be mounted on a fork 83 fixed on a shaft 84 which is slidably mounted in the supports 80 and 81. The fork engages the sides of the wheel 75 to move it to the desired welding position on the shaft 78. If necessary or desirable for heat dissipation, water may be flowed onto the wheel 75 from the conduits 85 and 86. This wheel electrode may be employed for spot welding as well as for seam welding and may be utilized with another electrode of any satisfactory form, such as those herein disclosed.

Figure 7:
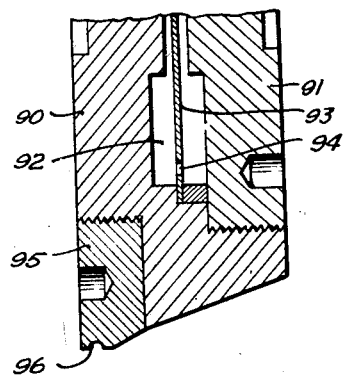
Fig. 7 is a partial sectional view of another form of electrode wheel embodying my invention.

Fig. 7 illustrates a further form of electrode wheel of my invention. The wheel includes a cup-shaped member 90 of copper or other suitable electrical conducting material having its open end covered by a cover plate 91 which is threaded into the member 90, these two parts of the electrode being arranged to provide a space 92 between them for the flow of cooling water through the wheel. A circular baffle plate 93 having apertures 94 disposed adjacent the outer periphery of the plate permits cooling water to flow through the baffle from one part of space 92 to the other. The water will of course, enter through the hub of the electrode wheel and after flowing through the wheel on both sides of the baffle plate, will leave the wheel through the other side. A stainless steel rim 95 having a groove 96 around its outer periphery to receive a small diameter wire, such as wire 77, is threadedly mounted on the member 90 of the wheel. With this arrangement, the greater part of the electrode wheel may be of relatively soft metal such as copper, a good electrical conductor, and the portion of the wheel which comes in contact with the wire 77, may be of a hard metal which will not deform readily. It will be understood that metals or materials other than copper and stainless steel may be employed for the parts of the wheel, if desired.

Electrodes of the forms herein disclosed may be employed to produce satisfactory spot or seam welds by prior art methods, such as current interruption and periodic material reductions of current value.

Any other type of current, including direct and oscillating current, may be utilized as well as alternating current to produce satisfactory seam or spot welds in accordance with my invention. The electrodes herein disclosed may be employed with any of these types of current. It is preferable that the mean effective value or the root mean square value of the current should be substantially constant in order to provide and maintain a substantially constant rate of heating of the work at the welding point or points. In some instances, it will be desirable to maintain the work in a stationary position and to produce the seam weld by appropriately moving the electrodes relative to the work. In lieu of the annular copper welding gaskets employed for the lower electrodes, an electrode the same as, or similar to the upper electrodes disclosed, may be used. One or more rollers of copper or other suitable metal may be employed for the lower electrode with an upper electrode the same as, or similar to, one of those disclosed herein. A straight, flat copper strip may be used for the lower electrode if straight seam welds are to be produced.

Since changes may be made in the form and arrangement of the several parts of the electrodes herein disclosed without departing from the principles of the invention, it will be understood that no intention is entertained to limit the invention except by the scope of the appended claims.

What is claimed is:

1. A welding electrode having an electrically conducting portion and an electrically nonconducting portion which engages the work at the weld area during the formation of the weld and through which the entire welding pressure is applied to the work.

2. A welding electrode having an electrically nonconducting portion which engages the work at the weld area during the formation of the weld and through which pressure is applied to the work, and an independently movable electrically conducting portion which engages the work in electrical contact during welding.

3. A welding electrode having an electrically conducting portion adapted for electrical work engagement upon an area such that the electric current, in its passage through the work, is confined substantially to that volume wherein the heat generated in the work is sufficient for the formation of the weld desired and is no greater than can be dissipated without injury to the electrode or the work, and having an electrically non-conducting portion adapted to engage the work adjacent the electrically contacted work area and through which the entire welding pressure is applied to the work.

4. A welding electrode having an electrically non-conducting work engaging portion and an electrically conducting portion, the latter being operable independently of the former.

5. A welding electrode having an electrically non-conducting work-engaging portion and an electrically conducting portion, and means independently operable for applying pressure to said portions, the entire welding pressure being applied through said electrically non-conducting portion.

6. A welding electrode having an electrically conducting body portion provided with a thin electrically non-conducting work-engaging surface, and a small electrically conducting portion projecting through said surface and adapted to engage the work.

7. A welding electrode having an electrically conducting body portion provided with a thin electrically non-conducting work-engaging surface, and a small electrically conducting wire projecting through said surface and adapted to engage the work.

8. A welding electrode having an electrically conducting body portion provided with a thin electrically non-conducting work-engaging surface, a small electrically conducting wire projecting through said surface and adapted to engage the work, and means for applying pressure to the wire independently of pressure applied to the body portion.

9. A welding electrode having an electrically conducting body portion provided with a thin electrically non-conducting work-engaging surface, a small electrically conducting wire projecting through said surface and adapted to engage the work, means for applying electric current to the wire, means for applying pressure to the body portion, means for applying pressure to the wire independently of the pressure applied to the body portion, and means for automatically relieving the pressure on the wire when the current supplied thereto is discontinued.

10. A welding electrode having an electrically conducting body portion provided with a thin electrically non-conducting work-engaging surface, a small electrically conducting wire projecting through said surface and adapted to engage the work, means for applying electric current to the wire, means for applying pressure to the body portion, means for applying pressure to the wire independently of the pressure applied to the body portion when current is supplied to the wire, and means for automatically relieving the pressure on the wire when the current supplied thereto is discontinued.

11. An electrode for electric resistance welding having a thin work-engaging portion consisting of relatively soft, electrical conducting material and means having a smooth, relatively hard surface disposed with respect to said portion so that the qualities of said surface are imparted to the work-engaging surface of said portion.

12. A wheel electrode for electric resistance welding comprising a substantially disc-shaped body portion of relatively soft material of high electric conductivity and an outer peripheral portion through which pressure on the work is applied, of a material which is not readily deformed under normal welding pressures.

13. A welding electrode having an electrically non-conducting work engaging portion through which the entire welding pressure is applied to the work, an electrically conducting portion, and fluid pressure actuated means for urging the latter into contact with the work independently of the operating means for the former.

14. A welding electrode having an electrically conducting body portion provided with an electrically non-conducting work-engaging surface, and an electrically conducting portion projecting through said surface and adapted to engage the work.

15. A welding electrode having an electrically conducting body portion provided with an electrically non-conducting work-engaging surface, an electrically conducting portion projecting through said surface and adapted to engage the work, and fluid pressure actuated means carried by the body portion for urging the electrically conducting portion into contact with the work.

16. A welding electrode having an electrically conducting body portion provided with an electrically non-conducting work-engaging surface, and an electrically conducting wire carried by the body portion and adapted to project through said surface into contact with the work, means for urging the wire into engagement with the work, and means for indicating the length of wire carried by the body portion.

17. A welding electrode having an electrically conducting body portion provided with an electrically non-conducting work-engaging surface, and an electrically conducting wire carried by the body portion and adapted to project through said surface into contact with the work, means for urging the wire into engagement with the work, and means associated with said urging means for indicating the length of wire carried by the body portion.

HENRY C. LOCKWOOD.